United States Patent Office 3,353,626
Patented Nov. 21, 1967
:::

3,353,626
SOUND ABSORBING VENTILATION CONDUIT WITH SIDE BRANCH CHAMBERS
Lothar Cremer, Ulrich Kurze, and Matthias Hubert, Berlin, Germany, assignors to Lothar Cremer, Berlin, Germany
Filed Dec. 7, 1964, Ser. No. 416,568
Claims priority, application Germany, Dec. 9, 1963, C 31,629
8 Claims. (Cl. 181—42)

ABSTRACT OF THE DISCLOSURE

A sound damping device for a gas conduit in which a plurality of spaced transverse walls in the conduit define at least one through-flow passage for the gas with laterally branching-off chambers which are separated from one another by said transverse walls and are separated from the passage by flow-conducting and air-permeable walls. Within each of the chambers is at least one narrow layer of porous sound absorbing material to subdivide such chambers into a plurality of compartments of approximately equal depth.

---

Figure 1A:
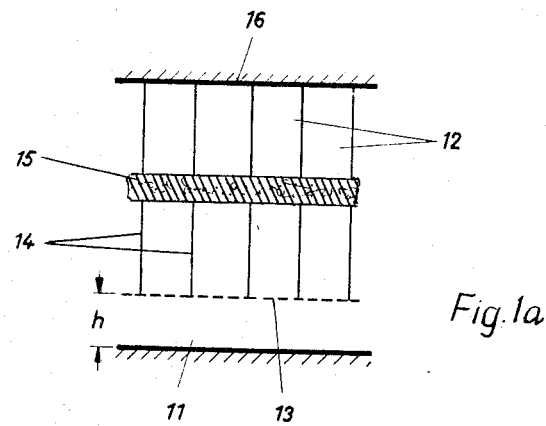

The invention relates to an absorption-type sound damping device for gas conduits and, more particularly, but not exclusively, for ventilation conduits.

It is known that sound waves contained in a given gas flow can be damped with minimum hindrance to the flow by arranging along a passage for the gas flow, laterally extending chambers which contain sound absorbing material and which are disposed behind perforated metal sheets, gauze or foil.

It is also known that there is for each specific frequency, an optimum chamber depth which, in the case of chambers of constant cross-section, is substantially equal to an odd multiple of a quarter wavelength, and that there is an optimum value for the effective resistance of the chamber which is measured at the entrance of the chamber and is determined by the position and type of absorbing material. The optimum effective resistance obtained in such cases is generally much smaller than the characteristic resistance (density times speed of sound) of the flowing gas. This means that, in order to fulfill the optimum conditions, such low flow resistances per unit of length are required that the commercially obtainable absorbing materials comprising organic or inorganic fibres generally have to be loosened. Also, with such loose packings there is a risk that during the course of time they will shake and fall on one another owing to vibrations and the effect produced will thus be modified.

Therefore, a further known practice is to replace the homogeneous packings by arranging commercially obtainable fibreboard panels either at the entrance of the chamber or directly before a rear wall of the chamber parallel to the passage.

However, in both cases a substantial disadvantage results as compared with the homogeneous packings if, as is generally the case, the damping device is not only to be effective at a specific frequency but at least over two octaves. For, as already mentioned, maximum damping effects are obtained with a chamber of constant cross-section if the chamber depth is equal to an odd multiple of a quarter wavelength. But between these "peak frequencies" there are always "trough frequencies" at which the depth corresponds to a multiple of half a wavelength and the damping effect is at a minimum. These minima are particularly marked if little energy will be taken from the associated wave field, and this is the case precisely when the absorbing material is situated at the beginning or at the end of the chamber, where the movements of the gas particles are always at their minima (nodes).

In order to obviate this disadvantage and to retain the advantages resulting from the use of narrow, porous layers of great packing density and therefore form-retaining qualities, it is contemplated according to the invention not to arrange these panels at the entrance or immediately before the rear wall of each chamber, but to subdivide the chambers in each case into several compartments of approximately equal size by narrow layers of porous absorbing material.

For raising the minimum damping effect at the first trough frequency it is most advantageous to arrange the layer of absorbing material substantially half-way along the chamber depth, i.e., in the antinode which occurs there.

At the second trough frequency, namely where the chamber depth is equal to a full wavelength, the fibreboard panel or layer of absorbing material arranged half-way along the chamber depth would indeed again be situated at a movement minimum—i.e., at an unsuitable point—to influence the second damping minimum which is to be expected. This shows that all the more panels must be distributed over the chamber depth in proportion as the designer wishes to take the effect of the chambers to higher frequencies. It is possible to formulate a simple rule, which is confirmed by measurement, that the $n$ first trough frequencies are effectively damped if the entire chamber depth is sub-divided by $n$ panels into $n+1$ sections.

But it is possible in an even simpler way to effectively remove energy from the oscillation fields at several trough frequencies by arranging the fibreboard panel not parallel to the passage and therefore perpendicularly to the chamber walls but at an inclination.

Generally it is not necessary to take into account the higher trough frequencies, since the sound waves of relatively high frequencies are very easy to damp with a downstream absorption-type damping device of simple construction which consists in known manner simply of a thin homogeneous lining of the conduit with absorbing material or of slides made of absorbing material which are situated in the passage. It also depends on the ratio of passage width to wavelength $\lambda$ to what extent a straight passage can also prevent the "radiation formation" which is to be expected at high frequencies. A slight inflection of the passage may be of more use in this connection than a relatively long damping device distance.

It is also possible to combine the proposed arrangement of the absorbing material in the form of a narrow layer, in comparison with the chamber depth, between the entrance and end of the chamber advantageously with the means which have hitherto been proposed and used in order to construct wide-band absorption-type damping devices in accordance with the chamber principle. These include above all arranging adjacent one another chambers of different depths, the so-called "Pan-pipes" system. It is expendient to approximate to the optimum flow resistance. This means that the flow resistance in the relatively short chambers is to be made higher than in the deeper chambers. In the relatively short chambers it may be possible in a simpler manner and without any disadvantages to fill them in a manner known per se homogeneously with absorbing material. It has also been found expedient to make the ratio of maximum to minimum depth approximately as 3:1.

It is also known, and it has also been found expedient, to incline the transverse walls in pairs towards one another i.e. to form wedge-shaped chambers, the chambers widening away from the passage (diverging) being tuned to lower values than the chambers tapering away from the passage (converging). Here again it may be possible in a simpler manner and without any disadvantages to fill the converging chambers homogeneously with absorbing material. In this case, more particularly, there is obtained almost along the entire passage wall the porous layer in the vicinity of the wall which is advantageous for absorbing relatively high frequencies.

It is readily possible to construct corresponding mirror-image elements between two parallel passages, in which case it is possible to dispense with the hitherto necessary rear wall of the now adjoining chambers, since owing to the symmetry of the wave fields an oscillation node always occurs here. Thus through chambers of double the depth are obtained.

It is also possible to use this double depth while halving the free entry fields in the interests of widening the effective range of the damping device against relatively low frequencies, by closing each second chamber alternately at one or the other side, i.e., making the transverse wall follow a meander course.

By combination with the wedge-shaped chambers, an even simpler zigzag transverse wall is obtained. This arrangement is also important when the chambers, as is known per se, are filled completely with loose absorbing material or are filled at the entrance and end with relatively compact absorbing material layers. It is also possible to have an advantageous combination with an absorption-type sound-damping device effective at high frequencies if the rear walls of the chambers are arranged at a short distance from the adjoining passage and the intervening space thus provided between the rear wall of the deep chamber and the flow-conducting casing is filled homogeneously with absorbing material.

Figure 3A:
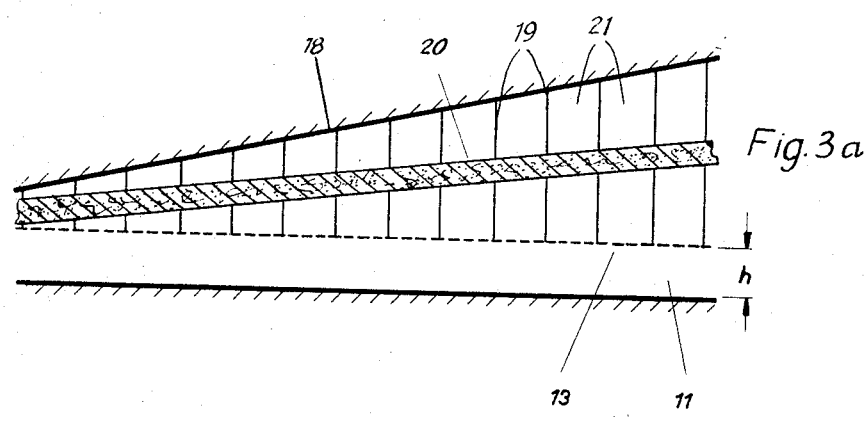
Figure 3B:
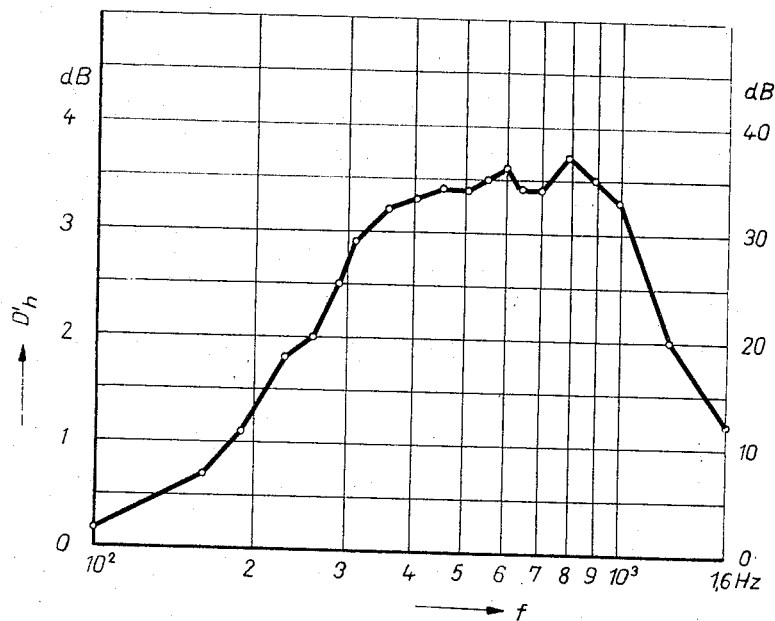
Figure 4A:
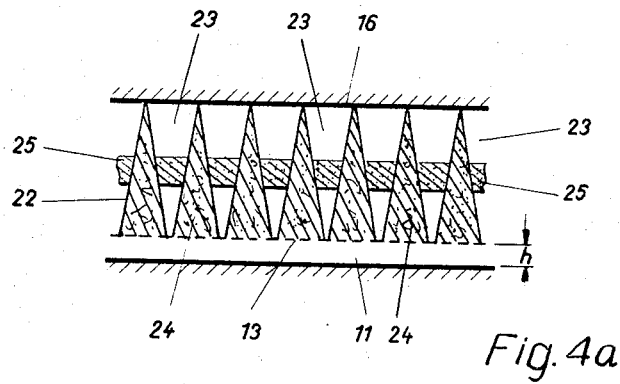
Figure 4B:
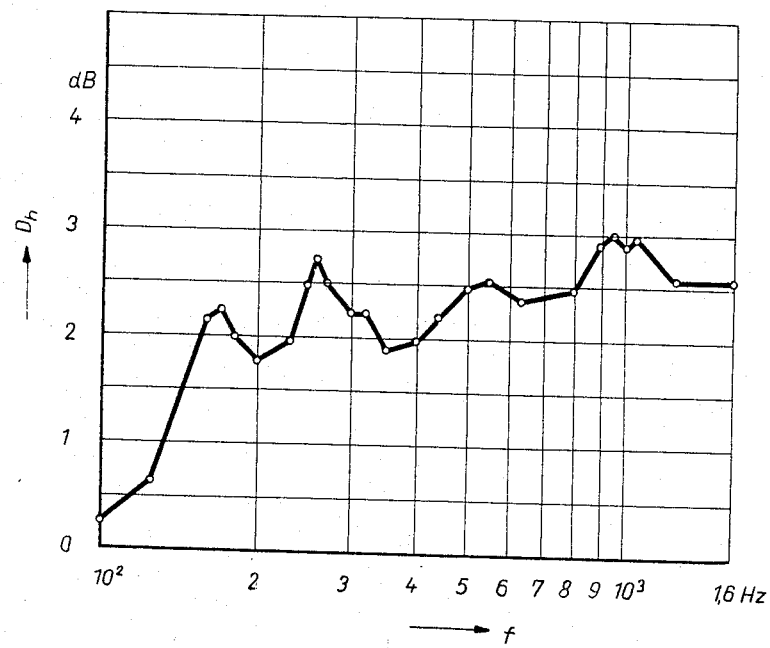
Figure 5:
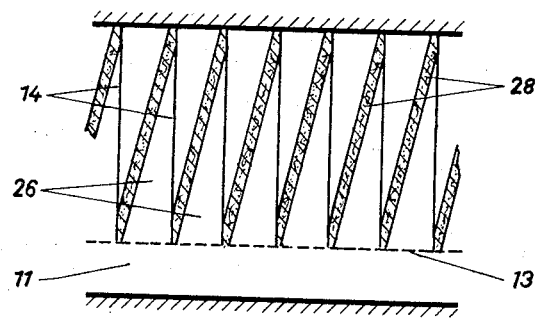
Figure 6:
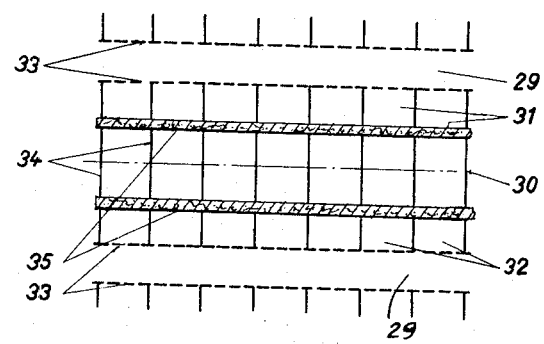
Figure 10:
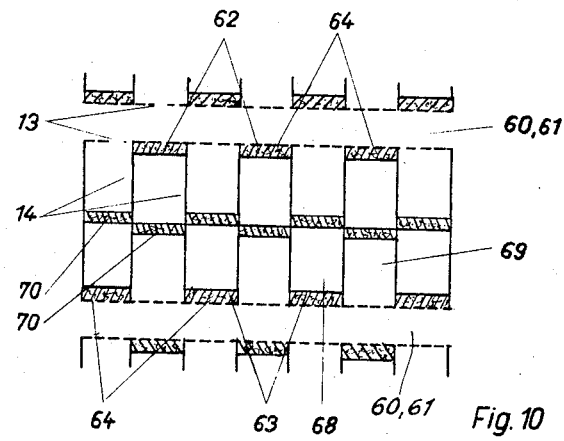

For a better understanding of the invention, froms of embodiment thereof will now be described, by way of example with reference to the accompanying drawings, in which:

FIGURES 1a–4a respectively each shows one of four different constructional forms of an absorption-type sound-damping device according to the invention and, FIGURES 1b–4b show a relevant diagram of the operation of the illustrated damping device, FIGURE 5 shows a further constructional form of the sound-absorbing damping device, and FIGURES 6 and 10 inclusive show constructional forms of a multi-passage sound-absorbing damping device.

The constructional form shown in FIGURE 1a comprises an absorption-type sound-damping device having a gas or ventilation throughflow passage 11 and chambers 12 which are of identical construction and adjacent one another. The chambers are formed by a rear wall 16 and transverse wall 14 which latter preferably extend at right angles to the passage 11 and which are bounded at the ends thereof opening on to the passage 11 by sound-permeable flow-conducting walls 13. The walls 13, which are indicated by broken lines, may be formed of perforated metal plates, metal gauze, thin foils or the like. The chambers 12 are provided half-way along their depth with a narrow layer of absorbing material 15 whereby the chambers are each sub-divided into two equally large compartments. The width of the passage 11 is designated as $h$.

Figure 1B:
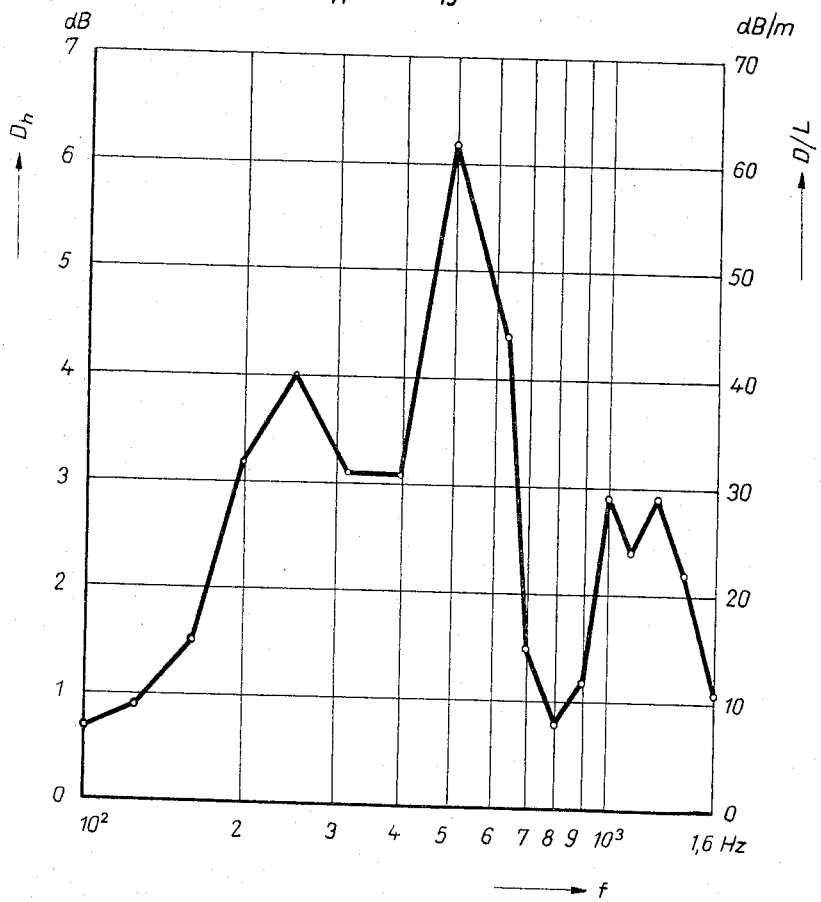

The manner in which the constructional form shown in FIGURE 1a operates will be clear from the associated diagram in FIGURE 1b and in which the particular frequencies are plotted as abscissae, using the usual logarithmic scale. The level difference $D_h$ in relation to half the width of a passage adjoining identical chambers at both sides, is shown on the ordinate axis with the number scale at the left-hand side of the diagram. (The level difference means the level difference D ascertained at a distance L divided by L and multiplied by half the passage width.) Owing to the reflection principle, the relevant sound field in this case in a passage adjoining similar chambers at both sides is equal to that in a passage of half the width $h$ which adjoins chambers only unilaterally. This simpler arrangement has been used as the basis for the measurements and is reproduced in FIGURES 1 to 4.

In FIGURES 1b to 3b there are additionally indicated at the right-hand side of the diagram, the level differences per meter i.e. $D/L$.

The measurement results shown in FIGURE 1b are obtained with a half passage width of $h=100$ mm., a chamber depth of 400 mm. and a thickness of 50 mm. for the absorbing material layer. The diagram shows that the trough between the two first peaks is only about 20% below the first peak, whereas the second trough is very strongly marked.

Figure 2A:
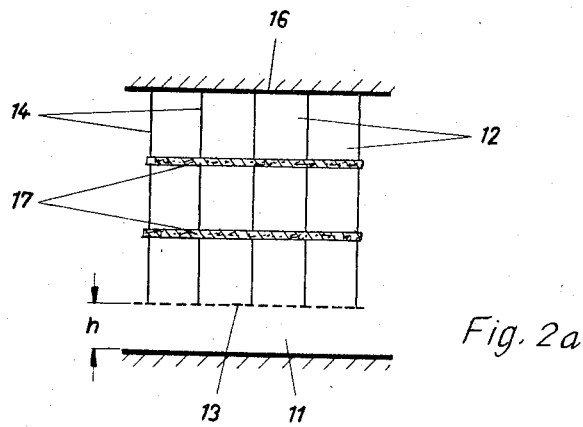
Figure 2B:
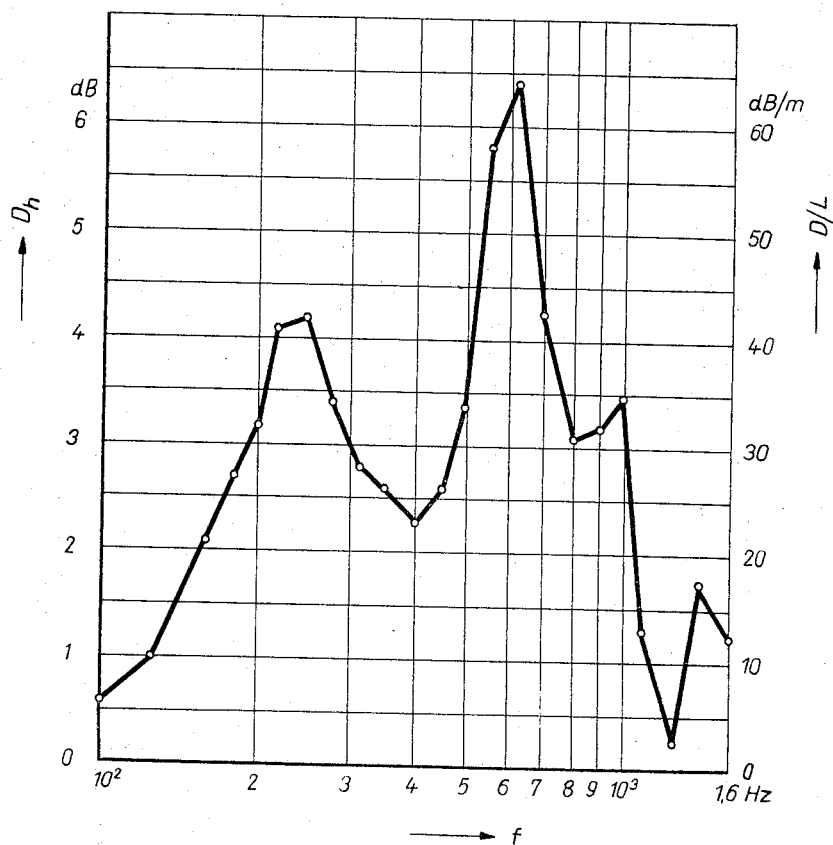

In the constructional form shown in FIGURE 2a, the passage 11, the chambers 12, the sound-permeable and flow-conducting walls 13 and the transverse walls 14 are constructed and arranged in the same way as in FIGURE 1a. Instead of a single absorbing material layer, however, two absorbing material layers 17 are arranged at such distances from one another and from the rear wall 16 and the flow-conducting wall 13 that the chambers are each sub-divided into three compartments which are approximately identical in size, the two absorbing material layers 17 being situated at one third and two thirds of the chamber depth.

The associated diagram is again prepared for a half passage width of $h=100$ mm. and a chamber depth of 400 mm. The thickness of the two absorbing material layers amounts to 10 mm. in each case. The results are such that the first trough is not filled out quite so satisfactorily, but now the second trough is less pronounced.

FIGURE 3a is based on the per se known Pan-pipes arrangement. The passage 11 and the sound-permeable flow-conducting wall 13 are constructed in the same way as in FIGURES 1a and 2a. But the rear wall, which is designated as 18, is inclined relatively to the front flow-conducting wall 13 so that the transverse walls 19 vary in length and chambers 21 of varying size are formed. The chambers are again each provided only with a single narrow absorbing material layer which is designated as 20 and it corresponds in thickness to that shown in FIGURE 1. The absorbing material layers 20 are shown, for the sake of simplicity of illustration, as if they were arranged in a straight continuation through the individual chambers. But in actual fact the absorbing material layers are stepped from chamber to chamber or may at least be so constructed. The chambers 21 themselves may also be stepped in this way by an appropriate configuration of the rear wall 18. The dimensions on which the associated diagram is based are again $h=100$ mm. and a 50 mm. thickness for the absorbing material layers, whereas the smallest chamber depth is 100 mm. and the largest chamber depth 300 mm. The absorbing material layers 20 divide the chambers 21 into two equal compartments in each case.

This arrangement supplies a much more balanced frequency path, as the diagram in FIGURE 3b shows.

FIGURE 4a shows a constructional form wherein by alternately inclining the transverse walls designated here as 22, diverging chambers 23 and converging chambers 24 are formed. According to the invention, a layer 25 of absorbing material is arranged at half the depth of the diverging chambers 23, while the converging chambers 24 are filled homogeneously in a manner known per se with loose absorbing material. The passage 11 and the sound-permeable flow-conducting wall 13 and the rear wall 16 are arranged in the same way as in FIGURES 1a and 2a.

As the diagram of FIGURE 4 shows, this wedge-shaped arrangement also gives a more or less uniform frequency pattern, the effect extending, despite a chamber depth of only 250 mm., from relatively low frequencies and owing to the homogeneous filling of the converging chambers up to very high frequencies. It should also be mentioned here that the opening of the diverging chambers is in each case only 5 mm. wide at the entrance while the spacing of the wedge points amounts to 100 mm. A half passage width of 50 mm. was used. But since the $D_h$ values entered on the same scale correspond to level differences which are related to half the passage width, the result can be compared directly with the other diagrams.

FIGURE 5a shows a constructional form of the absorption-type sound-damping device according to the invention wherein rectangular chambers 26 are provided behind the current-conducting sound-permeable wall 13. The narrow absorbing material layers designated here as 28 extend at an inclination in the direction of the diagonals and divide each of the chambers 26 into two compartments of equal size.

FIGURES 6 and 12 show constructional forms of the absorption-type sound-damping device with a plurality of passages, of which only two neighboring passages 29 are shown in each of these figures. Between these neighboring passages there are formed at each side of the dot-dash center line 30 in FIGURE 6 the rectangular chambers 31 and 32 which are bounded, where they open on to the passages 29, by sound-permeable flow-conducting walls 33 and which are separated from one another by the partition walls 34. According to the principle of the invention, the chambers 31, 32 which are arranged symmetrically in mirror-image fashion to one another, are each subdivided by a narrow absorbing material layer 35 into two equal compartments, but the rear walls of the chamber have been omitted.

Figure 7:
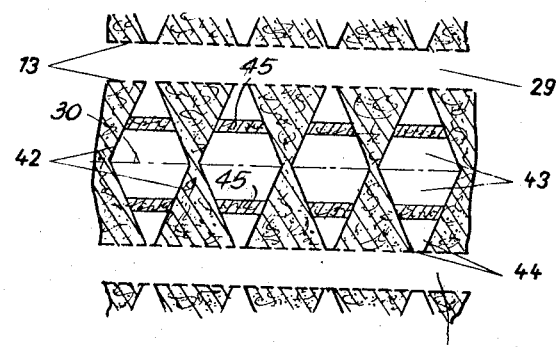

FIGURE 7 shows a similar constructional form but wherein, instead of rectangular chambers at both sides of the dot-dash center line 30, diverging chambers 43 and converging chambers 44 substantially corresponding to the chambers 23 and 24 of the constructional form shown in FIGURE 4 are arranged alternately between neighboring passages 29. Here again the respective rear walls of the chambers have been omitted, so that the chambers 43 and 44 situated at one side of the dot-dash line 30 are connected to the corresponding chambers 43 and 44 situated at the other side of this line. The converging chambers 44 are again filled homogeneously with loose absorbing material, while a narrow absorbing material layer 45 is arranged half-way along the depth of each of the diverging chambers 43. The transverse walls 42 extend in inclined manner towards one another in each case.

Figure 8:
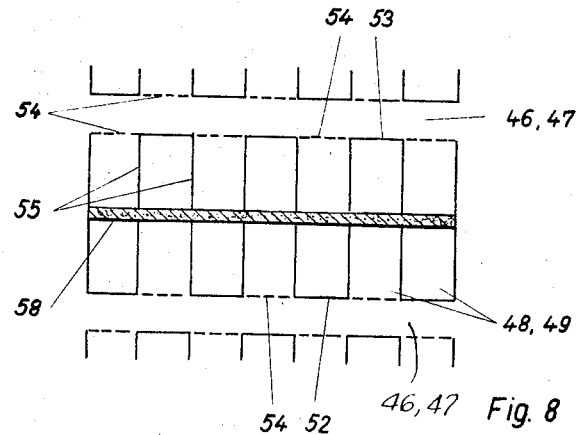
Figure 9:
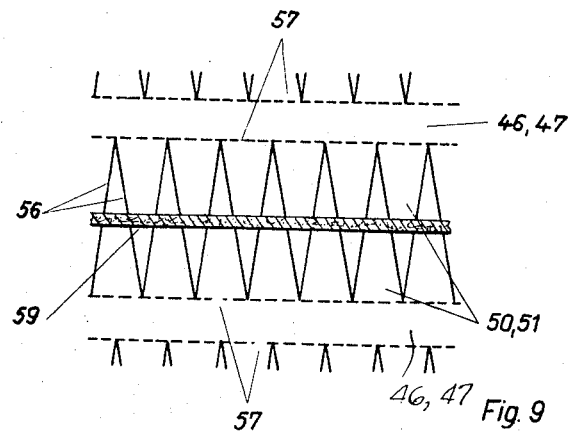

In order to achieve a double chamber depth, according to FIGURES 8 and 9 there are arranged in meander fashion between each two neighboring passages 46 and 47, rectangular chambers 48, 49 (FIGURE 8) or triangular chambers 50, 51 (FIGURE 9). In the constructional form shown in FIGURE 8, the chambers 49 are closed at their end adjacent the passage 47 and the chambers 48 at their end adjacent the other passage 46 as regards the passage of sound through the walls 52 and 53. Here, then, each chamber of the trough chambers extending from passage to passage between the two passages 46, 47 is alternately closed to the transfer of sound alternately at one or other passage, whereas the other chambers are bounded by sound-permeable flow-conducting walls 54 at their end adjacent the particular passage. The transverse walls are designated as 56 in FIGURE 8. In the constructional form shown in FIGURE 9, the construction is similar, except that here the transverse walls 56, in contrast to the transverse walls 55 in FIGURE 8, are inclined relatively to one another in pairs, so that the chambers 50, 51 are always closed at the points of the triangle against the penetration of sound and at the base of the triangle are connected by the flow-conducting walls 57 (represented in broken lines) in sound-permeable manner to the respective passage 46 or 47. In both cases, the chambers 48, 49 and 50, 51 are sub-divided into two compartments of equal size by narrow absorbing material layers 58 and 59 respectively arranged half-way along the depth of the chambers. As already mentioned, the constructional forms according to FIGURES 8 and 9 are also suitable for absorption-type sound-damping devices wherein the chambers 48, 49 and 50, 51 are homogeneously filled simply with loose absorbing material.

Finally, FIGURE 10 shows a constructional form which is constructed according to FIGURE 8 but wherein the sound-impermeable end walls 62, 63 are in each case arranged at some distance from the adjoining passage 60, 61 and the intermediate space formed thereby is filled with absorbing material 64. The narrow absorbing material layers 70 are arranged half-way along the depth of the rectangular chambers 68, 69. The sound permeable flow-conducting walls and the transverse walls are designated as 13 and 14 respectively in this case also.

What we claim is:

1. An absorption type sound-damping device for a gas conduit comprising a plurality of spaced transverse walls in said conduit defining at least one through-flow passage with laterally branching-off chambers which are separated from one another by said transverse walls, flow-conducting and air-permeable walls connected to said transverse walls and separating the chambers from the passage, and at least one narrow layer of porous sound-absorbing material in each of the chambers subdividing the same into a plurality of compartments of approximately equal depth.

2. A damping device according to claim 1, wherein only one layer of sound absorbing material is arranged substantially halfway along the depth of each chamber.

3. A damping device according to claim 1, wherein the layers of sound-absorbing material are arranged at an inclination to the passage axis.

4. A damping device according to claim 1, wherein the chambers are of different depth and the layers of sound-absorbing material in the chambers of greatest depth are of lower flow resistance than the layers of sound-absorbing material in the chambers of relatively shallow depth.

5. A damping device according to claim 4, wherein the ratio of the greatest chamber depth to the smallest chamber depth is 3:1.

6. A damping device according to claim 1 having a plurality of parallel passages, the chambers being arranged symmetrically in mirror-image relationship with respect to one another, their rear walls being omitted.

7. A damping device according to claim 1, having a plurality of parallel passages, the chambers being arranged between adjacent passages and extending from passage to passage, said chambers including sound impermeable end walls arranged at opposite ends to close adjacent chambers with their associated passages in alternation.

8. A damping device according to claim 7, wherein said sound impermeable end walls of the chambers are each arranged with spacing from the adjoining passage to form intervening spaces, and absorbing material filling said intervening spaces.

References Cited

UNITED STATES PATENTS

| Re. 22,283 | 3/1943 | Bourne | 181—48 |
| 2,989,136 | 6/1961 | Wohlberg | 181—48 X |

FOREIGN PATENTS

| 733,329 | 7/1955 | Great Britain. |

RICHARD B. WILKINSON, *Primary Examiner.*

ROBERT S. WARD, *Assistant Examiner.*